(12) United States Patent
Lei et al.

(10) Patent No.: US 12,547,721 B2
(45) Date of Patent: Feb. 10, 2026

(54) METHODS AND SYSTEMS FOR RECOGNIZING DISGUISED DEVICE

(71) Applicant: Alipay (Hangzhou) Information Technology Co., Ltd., Zhejiang (CN)

(72) Inventors: Xinxin Lei, Hangzhou (CN); Jinfu Chen, Hangzhou (CN); Xiaofei Wan, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 259 days.

(21) Appl. No.: 18/340,444

(22) Filed: Jun. 23, 2023

(65) Prior Publication Data
US 2023/0418945 A1 Dec. 28, 2023

(51) Int. Cl.
| H04L 29/06 | (2006.01) |
| G06F 21/57 | (2013.01) |
| G06F 21/62 | (2013.01) |

(52) U.S. Cl.
CPC .......... G06F 21/57 (2013.01); G06F 21/6218 (2013.01)

(58) Field of Classification Search
CPC ............................. G06F 21/57; G06F 21/6218
See application file for complete search history.

(56) References Cited

U.S. PATENT DOCUMENTS

| 2015/0067866 A1 | 3/2015 | Ibatullin et al. | |
| 2015/0172289 A1* | 6/2015 | Kwon ................. | H04W 12/122 726/3 |
| 2016/0119286 A1 | 4/2016 | Ibatullin et al. | |
| 2016/0192136 A1* | 6/2016 | Pan ..................... | H04W 64/006 455/456.1 |
| 2016/0337321 A1 | 11/2016 | Lin et al. | |

FOREIGN PATENT DOCUMENTS

| CN | 105765950 | | 7/2016 |
| CN | 106204143 | A | 12/2016 |
| CN | 108322486 | | 7/2018 |
| CN | 110769008 | A | 2/2020 |
| CN | 111241524 | | 6/2020 |
| CN | 111552717 | A | 8/2020 |
| CN | 113326482 | | 8/2021 |
| WO | WO 2012050933 | | 4/2012 |

OTHER PUBLICATIONS

Extended European Search Report in European Appln. No. 23180965.8, mailed on Nov. 30, 2023, 7 pages.

* cited by examiner

Primary Examiner — Wasika Nipa
(74) Attorney, Agent, or Firm — Fish & Richardson P.C.

(57) ABSTRACT

This disclosure relates to a method and a system for recognizing a disguised device. A client of an application is installed on the device for interacting with the application, and the method includes: in response to an interaction with an application installed on a device, receiving environment information and a device ID associated with the device, determining whether the device ID exists in a pre-stored association table of a unique environment identifier and a device ID, and in response to determining that the device ID does not exist in the association table, calculating a unique environment identifier associated with the device based on the environment information, searching the association table for a device ID associated with the unique environment identifier, and determining, based on a quantity of different identified device IDs associated with the unique environment identifier, whether the device is disguised.

14 Claims, 3 Drawing Sheets

METHODS AND SYSTEMS FOR RECOGNIZING DISGUISED DEVICE

CROSS-REFERENCE TO RELATED APPLICATIONS

This application claims priority to Chinese Patent Application No. 202210717214.5, filed on Jun. 23, 2022, which is hereby incorporated by reference in its entirety.

TECHNICAL FIELD

This disclosure relates to the field of recognizing a disguised device, and in particular, to methods and systems for recognizing a disguised device based on a unique environment identifier.

BACKGROUND

In recent years, with the popularity of Internet applications, a large quantity of cheating and fraudulent attacks on the Internet applications have been launched by forging device IDs (namely, unique identifiers of terminal devices), which severely affects normal running of the applications.

In this disclosure, improvements are made to factors that are not limited to the above-mentioned factors.

SUMMARY

Based on this, this disclosure provides methods and systems for recognizing a disguised device based on a unique environment identifier (namely, envID). The technical solution of this disclosure includes: A client of an application obtains privacy-deprived environment information (for example, a system environment, a spatial environment, and a temporal environment) that is unique to some extent and the like, and transmits the environment information and the like to a server of the application, and the server calculates a unique environment identifier based on the received environment information, and then determines, by using an association relationship between a unique environment identifier and a device ID based on the calculated unique environment identifier, whether the device is disguised. This solution does not involve privacy protection or limitations of the GDPR (General Data Protection Regulation), successfully protects user privacy information, and alleviates a problem of device disguise. In addition, the environment information is confidential, and therefore the difficulty of launching an attack by the black market through disguise is greatly increased.

According to a first aspect of this disclosure, a method for recognizing a disguised device is provided. A client of an application is installed on the device for interacting with the application, and the method includes: receiving environment information associated with the device and a device ID associated with the device in response to an interaction with the application from the device; determining whether the device ID exists in a pre-stored association table of a unique environment identifier and a device ID; and if the device ID does not exist in the association table, calculating a unique environment identifier associated with the device based on the environment information; searching the association table for a device ID associated with the unique environment identifier by using the unique environment identifier; and determining, based on a quantity of different identified device IDs associated with the unique environment identifier, whether the device is disguised.

According to some embodiments, the environment information is privacy-deprived information that is unique to some extent and is associated with the device.

According to other embodiments, the environment information includes at least one of system environment information, spatial environment information, and temporal environment information.

According to still other embodiments, the system environment information includes file system information associated with the device, and the file system information includes a file number and a size of a file provided by an operating system; the spatial environment information includes at least one of information from a sensor of the device and a Wi-Fi BSSID, and the sensor includes at least one of a gyroscope, a gravity sensor, an accelerometer, and a GPS receiver; and the temporal environment information includes at least one of a power-on time and power-on duration of the device, and a last modification time of a file.

According to still other embodiments, the environment information is collected by the client of the application and transmitted to a server of the application, and the unique environment identifier is calculated by the server.

According to still other embodiments, the method further includes: if the device ID exists in the association table, performing the following operations: associating the calculated unique environment identifier with the device ID, and storing the unique environment identifier and the device ID in the association table; or replacing a previous unique environment identifier associated with the device ID with the calculated unique environment identifier in the association table.

According to still other embodiments, the method further includes: first determining that duration in which the device ID exists in the association table exceeds a first threshold, and then performing the operation.

According to still other embodiments, the method further includes: if it is determined that the duration in which the device ID exists in the association table does not exceed the first threshold, searching the association table for the device ID associated with the unique environment identifier by using the unique environment identifier; and determining, based on the quantity of different identified device IDs associated with the unique environment identifier, whether the device is disguised.

According to still other embodiments, the determining, based on a quantity of different identified device IDs associated with the unique environment identifier, whether the device is disguised includes: if the quantity of different device IDs associated with the unique environment identifier exceeds a predetermined threshold, determining that the device is disguised.

According to still other embodiments, the predetermined threshold varies with the application.

According to still other embodiments, the collecting environment information associated with the device in response to an interaction with the application includes: collecting the environment information associated with the device only when there is a disguise risk for the interaction with the application.

According to still other embodiments, the pre-stored association table of the unique environment identifier and the device ID is predetermined and stored based on interactions of devices with the application.

According to still other embodiments, the method further includes: rejecting the interaction if it is determined that the device is disguised.

According to a second aspect of this disclosure, a system for recognizing a disguised device is provided. A client of an application is installed on the device for interacting with the application, and the system includes: a receiving module, where the receiving module is configured to receive environment information associated with the device and a device ID associated with the device in response to an interaction with the application from the device; a determining module, where the determining module is configured to determine whether the device ID exists in a pre-stored association table of a unique environment identifier and a device ID; a calculation module, where the calculation module is configured to calculate a unique environment identifier associated with the device based on the environment information if the device ID does not exist in the association table; and a disguise risk determining module, where the disguise risk determining module is configured to: search the association table for an associated device ID by using the unique environment identifier; and determine, based on a quantity of different identified device IDs associated with the unique environment identifier, whether the device is disguised.

According to a third aspect of this disclosure, a computing device for recognizing a disguised device is provided, and includes a processor and a memory. The memory stores computer-executable instructions. When the computer-executable instructions are executed by the processor, the method according to the first aspect of this disclosure is performed.

Various aspects usually include methods, apparatus, systems, computer program products, and processing systems basically described in this specification with reference to the accompanying drawings and illustrated by using the accompanying drawings.

The features and technical advantages according to the examples of this disclosure have been broadly outlined in the above-mentioned content, so that the following detailed descriptions can be better understood. Additional features and advantages are subsequently described. The disclosed concepts and specific examples can be readily used as a basis for modifying or designing other structures for implementing the same purposes as this disclosure. Such equivalent training does not depart from the scope of the appended claims. Organization and methods of operation of the characteristics of the concepts disclosed in this specification and associated advantages will be better understood by considering the following descriptions with reference to the accompanying drawings. Each drawing is provided for purposes of illustration and description, and does not define a limitation on the claims.

BRIEF DESCRIPTION OF DRAWINGS

To understand in detail the methods used for the above-mentioned features of this disclosure, more detailed descriptions of the briefly summarized content can be provided with reference to various aspects, and some aspects are illustrated in the accompanying drawings. However, it is worthwhile to note that only some typical aspects of this disclosure are illustrated in the accompanying drawings. Therefore, it should not be considered that the scope of this disclosure is limited, as the descriptions can allow for other equally effective aspects. The same reference numerals in different accompanying drawings can identify same or similar elements.

DESCRIPTION OF EMBODIMENTS

Figure 1:
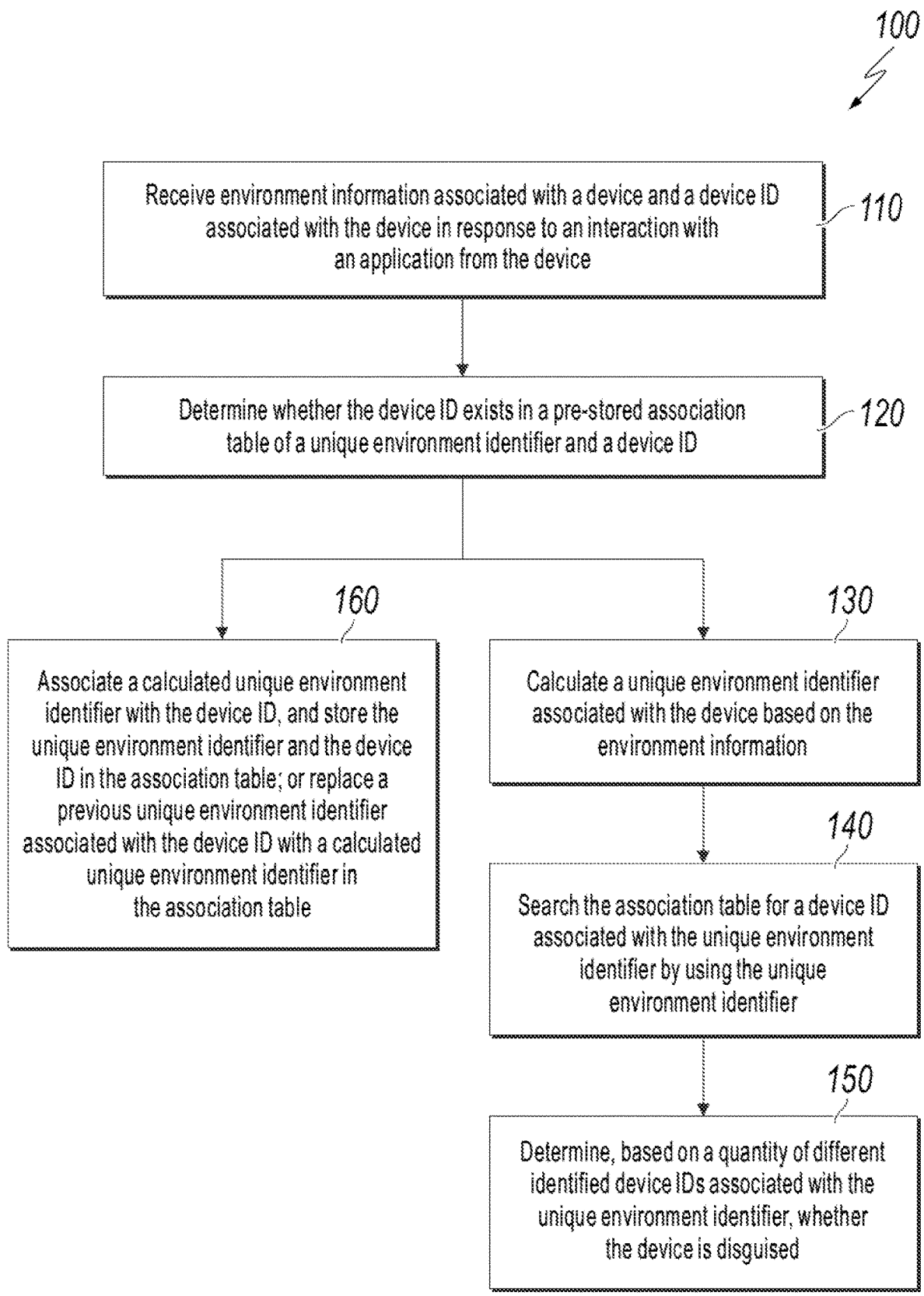
FIG. 1 is a flowchart illustrating a method for recognizing a disguised device, according to some embodiments of this disclosure.

The detailed descriptions set forth below with reference to the accompanying drawings are intended to be descriptions of various configurations, and are not intended to represent the only configurations in which the concepts described in this specification can be practiced. The detailed descriptions include specific details to provide a thorough understanding of various concepts. However, it is clear to a person skilled in the art that these concepts can be practiced without these specific details.

Explanation of Terms

GDPR is short for General Data Protection Regulation.
IMEI is short for international mobile equipment identity.
MAC is short for media access control address.
IDFA is short for identifier for advertising, is an ID for advertising, and is an identifier for advertising provided by APPLE to track users.
Device ID is a unique device identifier, and is used to uniquely identify a specific device.
EnvID is a unique environment identifier, and is used to uniquely identify a specific device.

In recent years, with the popularity of Internet applications, a large quantity of black-market persons have been attracted to launch cheating and fraudulent attacks on the applications through disguise. In a conventional prevention and control solution, a device ID is generated based on a unique device factor (for example, an IMEI, a MAC, or an IDFA), and whether a device is disguised is recognized based on the device ID. However, the black-market persons can continuously forge device IDs in batches based on a limited quantity of terminal devices by using some hacking technologies, to implement cheating and commit fraud, which severely affects normal running of the applications. In addition, with continuous upgrade of privacy protection and the GDPR, it is difficult to obtain unique information (for example, an IMEI, a MAC, or an IDFA) of a terminal, etc. Consequently, it is difficult for the device ID to converge in a risk control scenario, and disguise and fraud cannot be recognized by using the device ID.

Based on this, this disclosure provides methods and systems for recognizing a disguised device based on envID (namely, a unique environment identifier). The technical solution of this disclosure includes: A client of an application obtains privacy-deprived environment information (for example, a system environment, a spatial environment, and a temporal environment) that is unique to some extent and the like, and transmits the environment information and the like to a server of the application, and the server calculates a unique environment identifier based on the received environment information, and then determines, by using an association relationship between a unique environment identifier and a device ID based on the calculated unique environment identifier, whether the device is disguised. This solution does not involve privacy protection or limitations of the GDPR, successfully protects user privacy information, and alleviates a problem of device disguise by using the unique environment identifier (envID). In addition, the environment information is confidential, and therefore the difficulty of launching an attack by the black market is greatly increased. This is because it is difficult for disguised or fraudulent parties to determine specific environment information that is used in a process of calculating the unique environment identifier, and the parties cannot be disguised by tampering with the corresponding environment information.

FIG. 1 is a flowchart illustrating a method 100 for recognizing a disguised device, according to some embodiments of this disclosure. It is understood that the disguised device described in this disclosure is a device that disguises the device to an application by using various means, for example, disguises the device as another device to the application by forging a device ID, when interacting with the application through a client of the application installed on the device.

As shown in FIG. 1, the method 100 can include block 110 in which environment information associated with the device and a device ID associated with the device are received in response to an interaction with the application from the device. For example, the device can interact with the application through the client of the application installed on the device. For example, the device can start the application in response to a user input, and interact with various functions provided by the application.

In some embodiments, when the device interacts with the application through the client of the application, a server of the application can receive the environment information and device ID information of the device that are collected and transmitted by the client of the application. In the embodiments, the environment information is privacy-deprived information that is unique to some extent and is associated with the device. Further, according to the embodiments, the environment information can include at least one of system environment information, spatial environment information, and temporal environment information. Only several examples are provided. The system environment information can include any file system information associated with the device, for example, a file number and a size of a file provided by an operating system. The spatial environment information can include at least one of information from a sensor of the device, a Wi-Fi BSSID, etc., and the sensor can include at least one of a gyroscope, a gravity sensor, an accelerometer, a GPS receiver, etc. The temporal environment information can include at least one of a power-on time and power-on duration of the device, a last modification time of a file, etc. It is understood by a person skilled in the art that any privacy-deprived information that is unique to some extent and is associated with the device can be collected as the environment information to uniquely identify the corresponding device (at least to a sufficient extent, for example, a confidence of 90%) without user authorization (since the environment information is privacy-deprived and does not involve user privacy data). In a specific and non-limiting example, the client of the application can collect file numbers and sizes of certain system files of the operating system, last modification times of certain files, etc. In the embodiments, the device ID is a unique device identifier commonly used in the existing technology, for example, a MAC or an IMEI. Details are omitted here for simplicity.

In some embodiments of this disclosure, the environment information and the device ID information of the device are not collected for all interactions with the application, but are collected only when there is a disguise and/or fraudulent risk for the interaction with the application, to identify whether the device is disguised and/or fraudulent. For example, if interactions are to set various parameters of the application by using a setting function in the client of the application, there is no disguise and/or fraudulent risk for these interactions, and therefore the environment information of the device does not need to be collected for these interactions. In another example, if the application provides a device uniqueness-related function (for example, a new user or a new device of the application can obtain a specific benefit (for example, a bonus)), it is considered that there is a disguise and/or fraudulent risk for an interaction with the function, and therefore the environment information of the device needs to be collected for the interaction, to uniquely identify the device to determine whether the device is disguised and/or fraudulent.

Subsequently, the method 100 can include block 120 in which it is determined whether the device ID exists in a pre-stored association table of a unique environment identifier and a device ID. According to some embodiments of this disclosure, the pre-stored association table of the unique environment identifier and the device ID is predetermined and stored based on interactions of devices with the related application, and the unique environment identifier and the device ID are stored in the association table in association.

When the received device ID does not exist in the pre-stored association table of the unique environment identifier and the device ID, the method 100 can proceed to block 130 in which a unique environment identifier associated with the device is calculated based on the environment information. The calculated unique environment identifier can uniquely identify the related device with at least a sufficient confidence. For example, the calculated unique environment identifier can include a size of a first system file of the operating system of the device, a last modification time of a second file, and the power-on time of the device. A combination of such information can uniquely identify the device, to distinguish the device from other devices. It can be understood by a person skilled in the art that a combination of any appropriate information (in some embodiments, privacy-deprived information) can be used to identify the corresponding device uniquely enough. Details are omitted here for simplicity.

In some embodiments, the unique environment identifier is calculated by the server of the application (for example, at the cloud) to prevent the terminal device from knowing the specific environment information and a specific algorithm used for the unique environment identifier.

According to some embodiments of this disclosure, the calculating a unique environment identifier associated with the device can include: selecting appropriate environment information from the received environment information associated with the device, for example, file numbers and sizes of certain system files of the operating system and last modification times of certain files. It is understood by a person skilled in the art that the calculated unique environment identifier corresponds to the unique environment identifier in the pre-stored association table of the unique environment identifier and the device ID.

In some embodiments of this disclosure, the calculating a unique environment identifier can include: selecting, based on environment information included in the unique environment identifier in the pre-stored association table, appropriate environment information from the environment information received in block 110, to calculate the unique environment identifier. For example, assume that the unique environment identifier in the pre-stored association table includes the last modification time of the file. In this case, the last modification time of the file in the environment information received in block 110 can be selected for calculation when the unique environment identifier associated with the device is calculated in block 130.

Still referring to FIG. 1, the method 100 can include block 140 in which the association table is searched for a device ID associated with the unique environment identifier by using the calculated unique environment identifier and block 150 in which it is determined, based on a quantity of different identified device IDs associated with the calculated unique environment identifier, whether the device is disguised.

According to some embodiments of this disclosure, before the association table is searched for the associated device ID, the association table can be filtered to reduce entries that need to be compared, so as to increase a speed of determining whether the device is disguised. In an example, each entry (that is, a pair that includes a unique environment identifier and a device ID can be one entry) in the association table has existence duration, namely, duration elapsed since the entry is added to the association table. In this example, if the duration exceeds a predetermined threshold (for example, 2 hours, 1 day, or 3 days), it can be determined that the device associated with this entry is not disguised. This is because a disguised device usually frequently interacts with the application at a relatively high frequency. In this way, in the method 100, the reduced association table existing after the entry whose duration exceeds the predetermined threshold is excluded can be searched for the device ID associated with the calculated unique environment identifier, to reduce a check amount and increase a check speed.

In embodiments of this disclosure, if the quantity of different device IDs that are identified from the association table and that are associated with the calculated unique environment identifier exceeds a predetermined threshold, it is determined that the device is disguised. For example, if the device ID (it is worthwhile to note that the device ID is different from the received device ID before it is determined, before step 130, that the received device ID does not exist in the association table) associated with the unique environment identifier is identified from the association table, it can be determined that another device ID associated with the same unique environment identifier is currently received, and therefore it can be determined that the device disguises the device ID of the device. Further, according to the embodiments, the predetermined threshold can vary with the application. For example, the predetermined threshold can be set to 2 for some sensitive applications, so that one unique environment identifier can be associated with only one device ID; and the predetermined threshold can be set to another value for some other less sensitive applications. It is understood by a person skilled in the art that the predetermined threshold can be any appropriate value. Details are omitted here for simplicity.

According to other embodiments of this disclosure, when the received device ID exists in the pre-stored association table of the unique environment identifier and the device ID, the method 100 can proceed to block 160 in which a calculated unique environment identifier can be associated with the received device ID, and the unique environment identifier and the device ID can be stored in the association table. Alternatively, the method 100 can include: replacing a previous unique environment identifier associated with the received device ID with a calculated unique environment identifier in the association table. Further, according to the embodiments, after it is determined that the received device ID exists in the pre-stored association table of the unique environment identifier and the device ID and before step 160 is performed, it can be first determined whether duration in which the device ID exists in the association table exceeds a predetermined threshold (for example, 2 hours, 1 day, or 3 days). If the duration exceeds the predetermined threshold, it can be determined that the device associated with this entry is not disguised. This is because a disguised device usually frequently interacts with the application at a relatively high frequency. Subsequently, the method 100 can continue to perform step 160. On the contrary, if it is determined that the duration in which the device ID exists in the association table does not exceed the predetermined threshold, the method 100 can perform steps 130, 140, and 150 instead, to ensure that no disguised device is "missed".

According to other embodiments of this disclosure, before the association table is searched for the associated device ID, the association table can be filtered to reduce entries that need to be compared, so as to increase a speed of determining whether the device is disguised. In an example, each entry (that is, a pair that includes a unique environment identifier and a device ID can be one entry) in the association table has existence duration, namely, duration elapsed since the entry is added to the association table. In this example, if the duration exceeds a predetermined threshold (for example, 2 hours, 1 day, or 3 days), it can be determined that the device associated with this entry is not disguised. This is because a disguised device usually frequently interacts with the application at a relatively high frequency. In this way, in the method 100, the reduced association table existing after the entry whose duration exceeds the predetermined threshold is excluded can be searched for the device ID associated with the calculated unique environment identifier, to reduce a check amount and increase a check speed.

According to still other embodiments of this disclosure, the method 100 can further include: taking a corresponding countermeasure if it is determined that the device is disguised. For example, the interaction can be rejected if it is determined that the device is disguised.

It is understood by a person skilled in the art that the order of the steps of the method 100 shown in FIG. 1 is merely an example and the steps can be performed in a different order or in parallel as appropriate. For example, step 130 can be performed before or in parallel with step 120.

Figure 2:
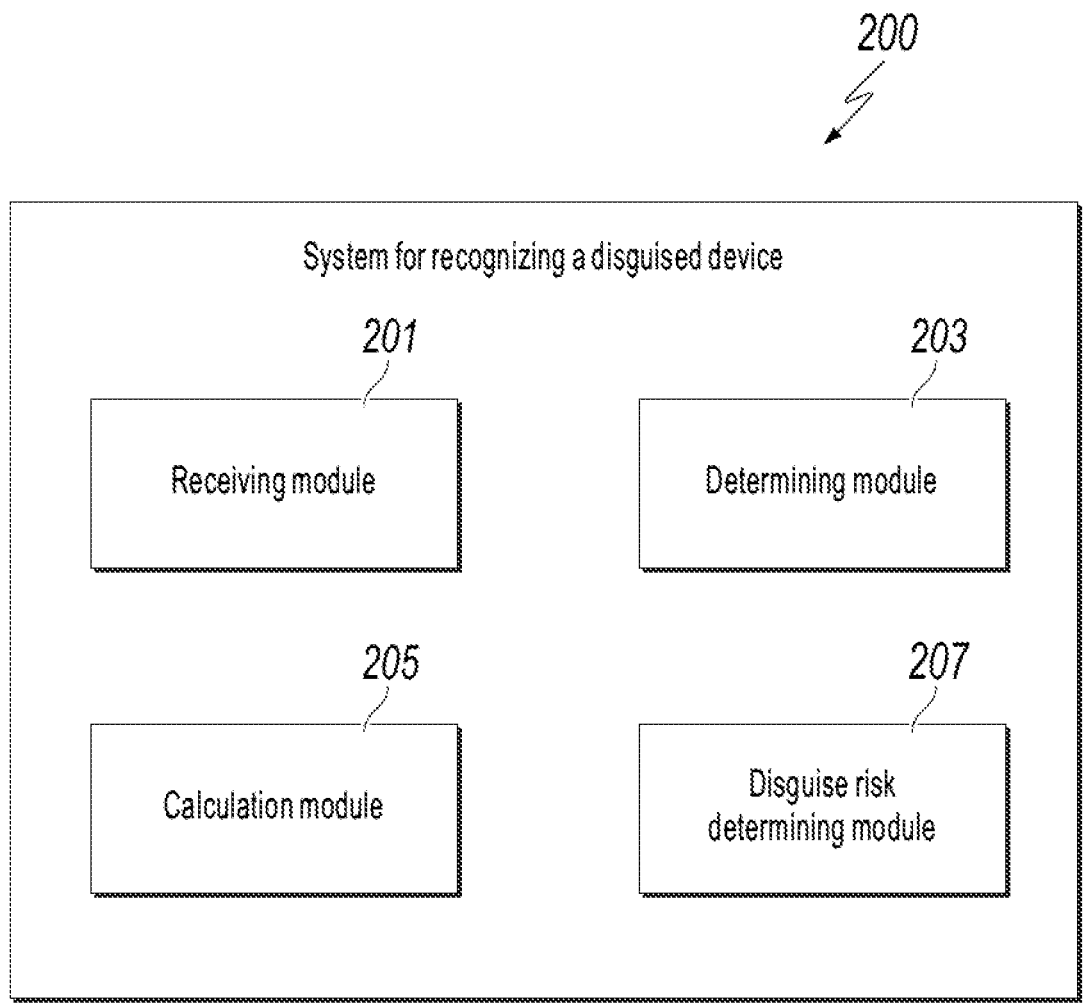
FIG. 2 is a schematic block diagram illustrating a system for recognizing a disguised device, according to some embodiments of this disclosure.

Here, FIG. 2 illustrates a system 200 for recognizing a disguised device, according to some embodiments of this disclosure.

As shown in FIG. 2, the system 200 can include: a receiving module 201, where the receiving module 201 is configured to receive environment information associated with the device and a device ID associated with the device in response to an interaction with an application from the device; a determining module 203, where the determining module 203 is configured to determine whether the device ID exists in a pre-stored association table of a unique environment identifier and a device ID; a calculation module 205, where the calculation module 205 is configured to calculate a unique environment identifier associated with the device based on the environment information if the device ID does not exist in the association table; and a disguise risk determining module 207, where the disguise risk determining module 207 is configured to: search the association table for an associated device ID by using the unique environment identifier; and determine, based on a quantity of different identified device IDs associated with the unique environment identifier, whether the device is disguised.

Figure 3:
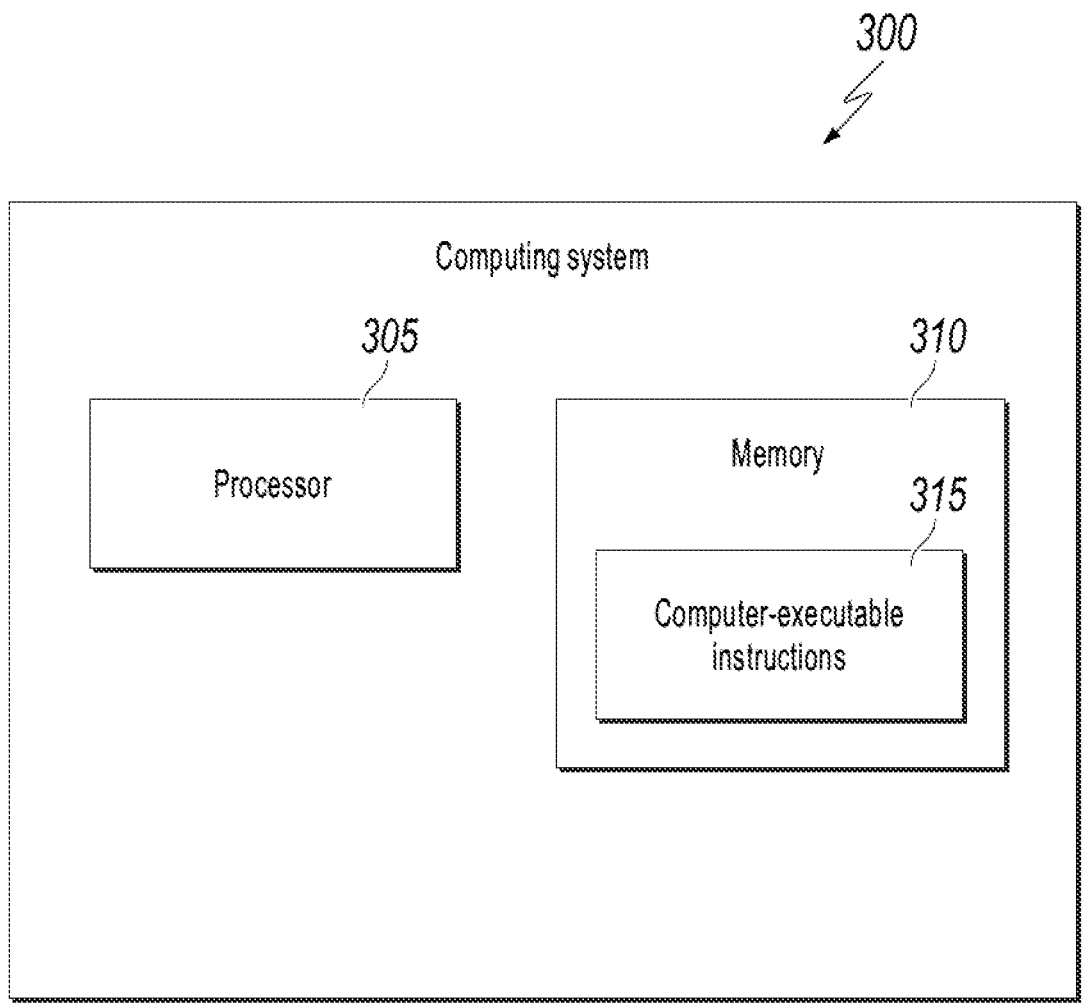
FIG. 3 is a schematic block diagram illustrating another system for recognizing a disguised device, according to some embodiments of this disclosure.

Subsequently, FIG. 3 is a schematic diagram illustrating a computing system 300 for recognizing a disguised device, according to some embodiments of this disclosure. As shown in the figure, the computing system 300 can include a processor 305 and a memory 310 arranged to store computer-executable instructions 315. When the computer-executable instructions 315 are executed by the processor 305, the processor 305 can be enabled to perform the method 100 described in FIG. 1 according to this disclosure.

Although in the descriptions of this disclosure, the device ID is received from the device, it can be understood that the device ID can alternatively be calculated by the server based on a hardware factor (for example, a MAC, an IMEI, or an IDFA) from the device. Details are omitted here for simplicity.

The above-mentioned description of embodiments includes references to the accompanying drawings, and the accompanying drawings form a part of the description of embodiments. Specific embodiments that can be practiced are shown in the accompanying drawings by way of illustration. These embodiments are also referred to as "examples" in this specification. Such examples can include elements other than those shown or described. However, examples including the shown or described elements are also contemplated. In addition, examples using any combination or arrangement of the elements shown or described, specific examples (or one or more aspects thereof) provided with reference to the elements shown or described in this specification, or other examples (or one or more aspects thereof) provided with reference to the elements shown or described in this specification are also contemplated.

In the appended claims, the terms "include" and "comprise" are open-ended, that is, systems, devices, articles, or processes of elements other than those listed after such terms in the claims are still considered to fall within the scope of the claims. In addition, in the appended claims, the terms "first", "second", "third", etc. are merely used as labels, and are not intended to indicate a numerical order of objects corresponding to the terms.

Furthermore, the order of the operations illustrated in this specification is an example. In alternative embodiments, the operations can be performed in an order different from that shown in the accompanying drawings, and the operations can be combined into a single operation or split into more operations.

The above-mentioned descriptions are intended to be illustrative and non-limiting. For example, the examples (or one or more aspects thereof) described above can be used in combination with other embodiments. Other embodiments can be used, for example, by a person of ordinary skill in the art after reviewing the above-mentioned descriptions. The abstract allows the reader to quickly determine the nature of this technical disclosure. The abstract is submitted, and it is understood that the abstract is not intended to explain or limit the scope or meaning of the claims. In addition, in the above-mentioned description of embodiments, various features can be grouped together to streamline this disclosure. However, all features disclosed in this specification may not be stated in the claims, as the embodiments can represent a subset of the features. In addition, the embodiments can include fewer features than those disclosed in the specific examples. Therefore, the appended claims are incorporated into the description of embodiments, and a claim exists independently as a separate embodiment. The scope of the embodiments disclosed in this specification should be determined with reference to the complete scope of the appended claims and equivalents to which such claims are entitled.

The invention claimed is:

1. A computer-implemented method for recognizing a disguised device, the method comprising:
   in response to an interaction with an application installed on a device, receiving environment information and a device ID associated with the device;
   determining whether the device ID exists in a pre-stored association table of a unique environment identifier and a device ID; and
   in response to determining that the device ID does not exist in the association table:
   calculating a unique environment identifier associated with the device based on the environment information, wherein the environment information is privacy-deprived information associated with the device, wherein the environment information comprises at least one of system environment information, spatial environment information, or temporal environment information, and wherein:
   the system environment information comprises file system information associated with the device, and the file system information comprises a file number and a size of a file provided by an operating system;
   the spatial environment information comprises at least one of information from a sensor of the device and a Wi-Fi BSSID, and the sensor comprises at least one of a gyroscope, a gravity sensor, an accelerometer, or a GPS receiver; and
   the temporal environment information comprises at least one of a power-on time and power-on duration of the device, or a last modification time of a file;
   searching the association table for a device ID associated with the unique environment identifier;
   identifying different device IDs in the association table that are associated with the unique environment identifier; and
   determining, based on a quantity of the identified different device IDs associated with the unique environment identifier exceeding a predetermined threshold, that the device is disguised, wherein the predetermined threshold is greater than one.

2. The method according to claim 1, wherein the environment information is collected by the application and transmitted to a server of the application, and the unique environment identifier is calculated by the server.

3. The method according to claim 1, wherein the method further comprises:
   in response to determining that the device ID exists in the association table:
   associating the calculated unique environment identifier with the device ID and storing the unique environment identifier and the device ID in the association table; or
   replacing a previous unique environment identifier associated with the device ID with the calculated unique environment identifier in the association table.

4. The method according to claim 3, further comprising:
   in response to determining that a duration in which the device ID exists in the association table does not exceed a first threshold:
   searching the association table for the device ID associated with the unique environment identifier; and
   determining, based on the quantity of different identified device IDs associated with the unique environment identifier, whether the device is disguised.

5. The method according to claim 1, wherein determining whether the device is disguised comprises:

if the quantity of different device IDs associated with the unique environment identifier exceeds a predetermined threshold, determining that the device is disguised.

6. The method according to claim 5, wherein the predetermined threshold is specific to the application.

7. The method according to claim 1, wherein the pre-stored association table of the unique environment identifiers and the device IDs is predetermined and stored based on interactions of devices with the application.

8. The method according to claim 1, further comprising: rejecting the interaction in response to determining that the device is disguised.

9. A non-transitory, computer-readable medium storing one or more instructions executable by a computer system to perform operations comprising:
   in response to an interaction with an application installed on a device, receiving environment information and a device ID associated with the device;
   determining whether the device ID exists in a pre-stored association table of a unique environment identifier and a device ID; and
   in response to determining that the device ID does not exist in the association table:
   calculating a unique environment identifier associated with the device based on the environment information, wherein the environment information is privacy-deprived information associated with the device, wherein the environment information comprises at least one of system environment information, spatial environment information, or temporal environment information, and wherein:
   the system environment information comprises file system information associated with the device, and the file system information comprises a file number and a size of a file provided by an operating system;
   the spatial environment information comprises at least one of information from a sensor of the device and a Wi-Fi BSSID, and the sensor comprises at least one of a gyroscope, a gravity sensor, an accelerometer, or a GPS receiver; and
   the temporal environment information comprises at least one of a power-on time and power-on duration of the device, or a last modification time of a file;
   searching the association table for a device ID associated with the unique environment identifier;
   identifying different device IDs in the association table that are associated with the unique environment identifier; and
   determining, based on a quantity of the identified different device IDs associated with the unique environment identifier exceeding a predetermined threshold, that the device is disguised, wherein the predetermined threshold is greater than one.

10. The non-transitory, computer-readable medium according to claim 9, wherein the environment information is collected by the application and transmitted to a server of the application, and the unique environment identifier is calculated by the server.

11. The non-transitory, computer-readable medium according to claim 9, wherein the operations further comprises:
   in response to determining that the device ID exists in the association table:
   associating the calculated unique environment identifier with the device ID and storing the unique environment identifier and the device ID in the association table; or
   replacing a previous unique environment identifier associated with the device ID with the calculated unique environment identifier in the association table.

12. The non-transitory, computer-readable medium according to claim 11, further comprising:
   in response to determining that a duration in which the device ID exists in the association table does not exceed a first threshold:
   searching the association table for the device ID associated with the unique environment identifier; and
   determining, based on the quantity of different identified device IDs associated with the unique environment identifier, whether the device is disguised.

13. The non-transitory, computer-readable medium according to claim 9, wherein determining whether the device is disguised comprises:
   if the quantity of different device IDs associated with the unique environment identifier exceeds a predetermined threshold, determining that the device is disguised.

14. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   in response to an interaction with an application installed on a device, receiving environment information and a device ID associated with the device;
   determining whether the device ID exists in a pre-stored association table of a unique environment identifier and a device ID; and
   in response to determining that the device ID does not exist in the association table:
   calculating a unique environment identifier associated with the device based on the environment information, wherein the environment information is privacy-deprived information associated with the device, wherein the environment information comprises at least one of system environment information, spatial environment information, or temporal environment information, and wherein:
   the system environment information comprises file system information associated with the device, and the file system information comprises a file number and a size of a file provided by an operating system;
   the spatial environment information comprises at least one of information from a sensor of the device and a Wi-Fi BSSID, and the sensor comprises at least one of a gyroscope, a gravity sensor, an accelerometer, or a GPS receiver; and
   the temporal environment information comprises at least one of a power-on time and power-on duration of the device, or a last modification time of a file;
   searching the association table for a device ID associated with the unique environment identifier; and
   identifying different device IDs in the association table that are associated with the unique environment identifier; and
   determining, based on a quantity of the identified different device IDs associated with the unique environment identifier exceeding a predetermined threshold, that the device is disguised, wherein the predetermined threshold is greater than one.

* * * * *